United States Patent [19]
Downs

[11] Patent Number: 5,184,414
[45] Date of Patent: Feb. 9, 1993

[54] FLOATING FISHING LIGHT AND TRANSDUCER

[76] Inventor: James Downs, P.O. Box 983, Whitney, Tex. 76692

[21] Appl. No.: 651,806

[22] Filed: Feb. 7, 1991

[51] Int. Cl.⁵ .............................................. A01K 97/12
[52] U.S. Cl. ........................................................ 43/17.5
[58] Field of Search ........................................... 43/17.5

[56] References Cited

U.S. PATENT DOCUMENTS

| | | | |
|---|---|---|---|
| 1,192,001 | 7/1916 | Ryan | 43/17.5 |
| 2,908,101 | 10/1959 | Butler | 43/17.5 |
| 3,464,139 | 9/1969 | Eggers | 43/17.5 |
| 3,502,861 | 3/1970 | Evans | 43/17.5 |
| 3,510,978 | 5/1970 | Murdock | 43/17.5 |
| 3,617,733 | 11/1971 | Adams | 43/17.5 |
| 4,475,301 | 10/1984 | Wortham | 43/17.5 |
| 4,553,194 | 11/1985 | Bailey | 43/17.5 |
| 4,805,337 | 2/1989 | Kurata | 43/17.5 |
| 5,003,719 | 4/1991 | Whitlock et al. | 43/17.5 |

Primary Examiner—Kurt C. Rowan

[57] ABSTRACT

A floating fishing light and tranducer apparatus 10 is provided to be used while fishing in a boat 11. The apparatus 10 includes a bouyant housing member 12 having a light 22 and transducer 34 coupled thereto. The light 22 is provided to attract fish thereto while the transducer 34 emits a signal which facilitates the determination of the presence and depth of fish in a designated area. As a result the chances of catching fish are enhanced.

10 Claims, 4 Drawing Sheets

FLOATING FISHING LIGHT AND TRANSDUCER

TECHNICAL FIELD

This invention relates to a fishing light and more particularly to a fishing light and transducer which combines to light up an area while drawing fish to the area and identifying their presence and depth. Fishing is an ever growing endeavor whose popularity increases as a sport and as a commerical enterprise. Because of the increased popularity there have been a number of different developments such as fish finding devices to enhance ones chance for catching the fish. Although there are many different fish finding devices there continues to be an ongoing concern in this area. One particular area of concern will always be how to increase the catch with the simpliest and least expensive device. Traditionally devices designed to increase the opportunity to catch the fish have been boat onboard fish finding devices submersible devices. The devices onboard the boat are not always efficient particularly when the fish are directly under the boat. The submersible devices because they are submersible can more often than not be complex and expensive because of the need to protect it from the adverse affects of the water.

Because of the ongoing need and desire to improve one's ability to catch fish with as simple and inexpensive an apparatus as possible a floatable device remotely displaced from the boat becomes desirable.

BACKGROUND ART

Attempts have been made to provide devices that address the need to provide greater ability to catch fish. The most common device is the onboard fish locator. However these devices can be ineffective when fish are in close proximity to the boat or in a brisky area the boat can't enter because the transmitter such as a ransducer is traditionally attached to the boat. Another device is disclosed in U.S. Pat. No. 4,190,976. This device is known as a fishing light. The device produces both light and sound when immersed in water. The device includes a halogen fill quartz envelope lamp, the base of which is enclosed in an insulated elestomer and then enclosed in a body of material such as lead having significant negative buoyancy. In this arrangement the lamp which is submerged under water produces intense light and a crackling sound which is attractive to fish. This is a somewhat intricate structure necessitated to some degree by the fact that it must be submerged which in some states is against the law. Still another arrangement is disclosed in U.S. Pat. No 4,187,533. This device which is a submersible fishing lamp includes a pair of spaced non-transparent circular plates between which is disposed an electric lamp bulb. The appliance is provided to aid in attracting fish to a baited fish hook and artificial lure.

These arrangements have realized some success. However there remains a need for a simple device which facilitates the maximum opportunity to catch fish. This becomes achievable by providing a floatable device which is remote from the boat.

DISCLOSURE OF THE INVENTION

A floating fishing light and transducer is provided to greatly inprove the chance of catching fish. The device in accordance with this invention includes a housing and a light emitting means mounted in an upper portion of the housing. A buoyant member which is coupled around a lowermost portion of the housing floats on top of the water as well as maintains the housing on top of the water. A signal emitting means is coupled to the bouyant member so that portions thereof extend into the water when the boyant member is floating on the water. A power source is provided for activating the light emitting means and signal emitting means. A means is provided for electrically coupling the light emitting means and signal emitting means to the power source so that the light emitting means and signal emitting means can be selectively activated.

BRIEF DESCRIPTION OF THE DRAWING

The details of the invention will be described in connection with the accompanying drawing in which.

BEST MODE FOR CARRYING OUT THE INVENTION

Figure 1:
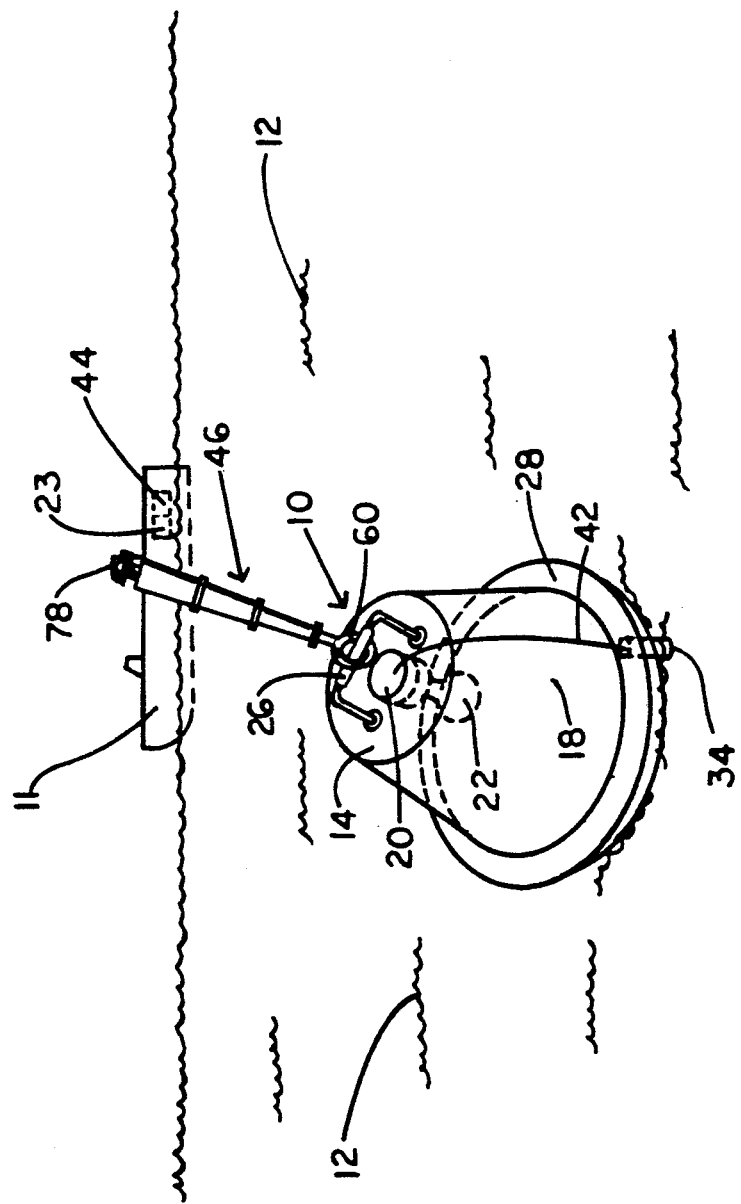
FIG. 1 is a perspective environmental view illustrating a Floating Fishing Light and Transducer in accordance with the principles of this invention.
Figure 2:
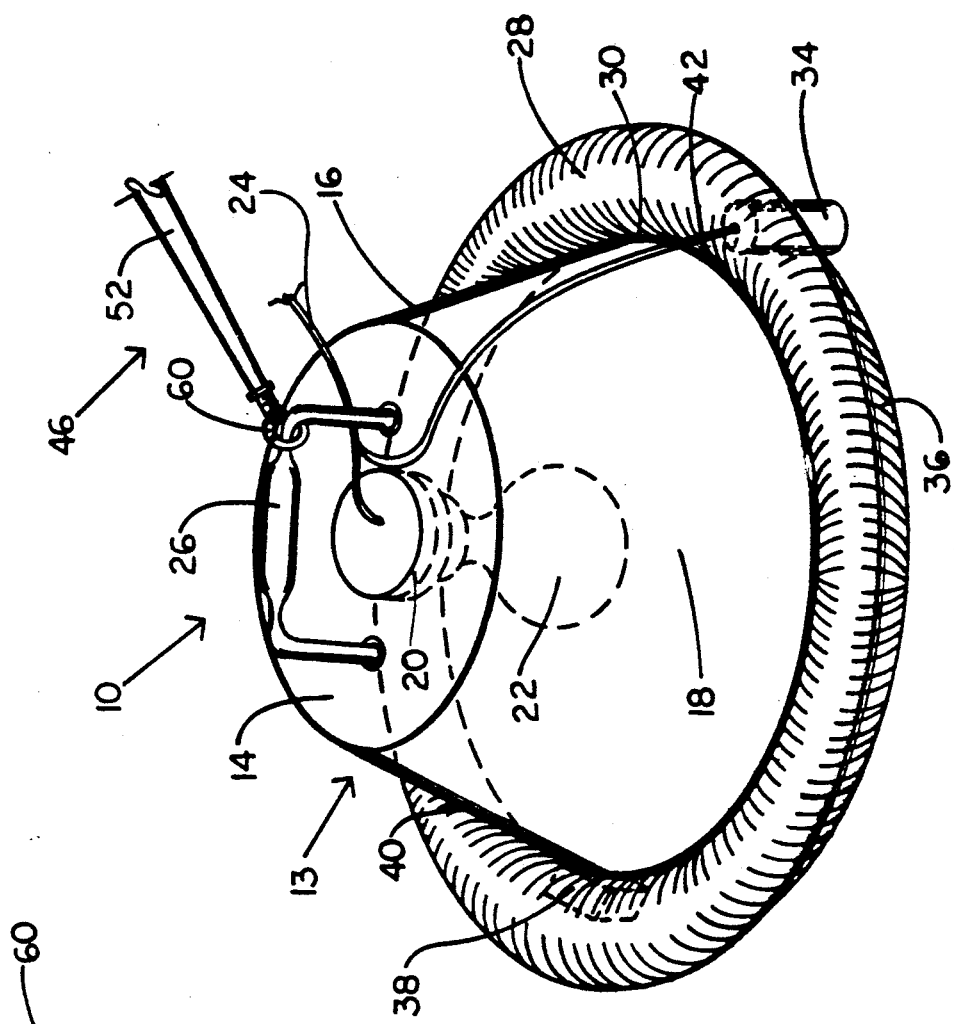
FIG. 2 is a perspective view illustrating the Floating Fishing Light and Transducer of FIG. 1 in accordance with the principles of this invention.

Referring to FIGS. 1 and 2 there is shown a floating fishing light and transducer apparatus, generally designated, by the numeral, 10 in accordance with the principles of the invention. The floating fishing light and transducer is illustrated positioned adjacent to a boat 11 in a body of water 12. The floating fishing light and transducer 10 includes a yellow cone shaped support housing generally designated by the numeral, 13. The support housing 13 is provided with an upper wall portion 14. The support housing 13 also includes diagonally descending wall portions 16 which are coupled to the upper wall portion 14. The upper wall portion 14 and wall portions 16 are coupled together to form an open area 18 therebetween. A light fixture 20 is coupled to the upper wall portion 14 of the support housing 13. The light fixture 20 is provided to accomodate and activate a light bulb 22. The light bulb 22 may be clear or white or some other similar color. This will light up the area and allow the apparatus 10 to serve as a buoy while the light attracts the fish thereto. At night the buoy acts as a safety light. With the Light shining through the sides 13 the apparatus 10 can be seen more than one fourth (¼) of a mile on a dark night. The light that shines through also is used to see the user's fishing pole and bait hooks. The light fixture 20 is electrically coupled to a power source 23, such as, for example, a 12 volt battery on board the boat 11 by electrical leads 24. A handle 26 is coupled to the upper wall portion 14 of the support housing 13 to facilitate movement of the apparatus 10.

The floating fishing light and transducer 10 is also provided with a floatation device 28. The floatation device 28 is coupled around lowermost portions 30 of the wall portions 16 of the support housing 13. The floatation device may be, for example, an air filled rubber tube of a foam member capable of floating on top of the water 12.

A transducer 34 for emitting a signal therefrom is coupled to a lower portion 36 of the floatation device so that portions thereof extend into the water 12. A counter weight 38 is coupled to a lower portion of the support housing 13 to counter balance the weight of the transducer 34 and assure that the apparatus 10 is always properly floating on the water 12. The transducer 34 is electrically coupled by electrical leads 42 to the power source 23 and on board fish locating equipment 44. The fish locating equipment 44 responds to signals generated by the transducer 34 to provide indications of the presence of fish and their depth in a well known manner. The accuracy of this process is enhanced because the transducer 34 is remotely displaced from the boat 11.

Figure 3:
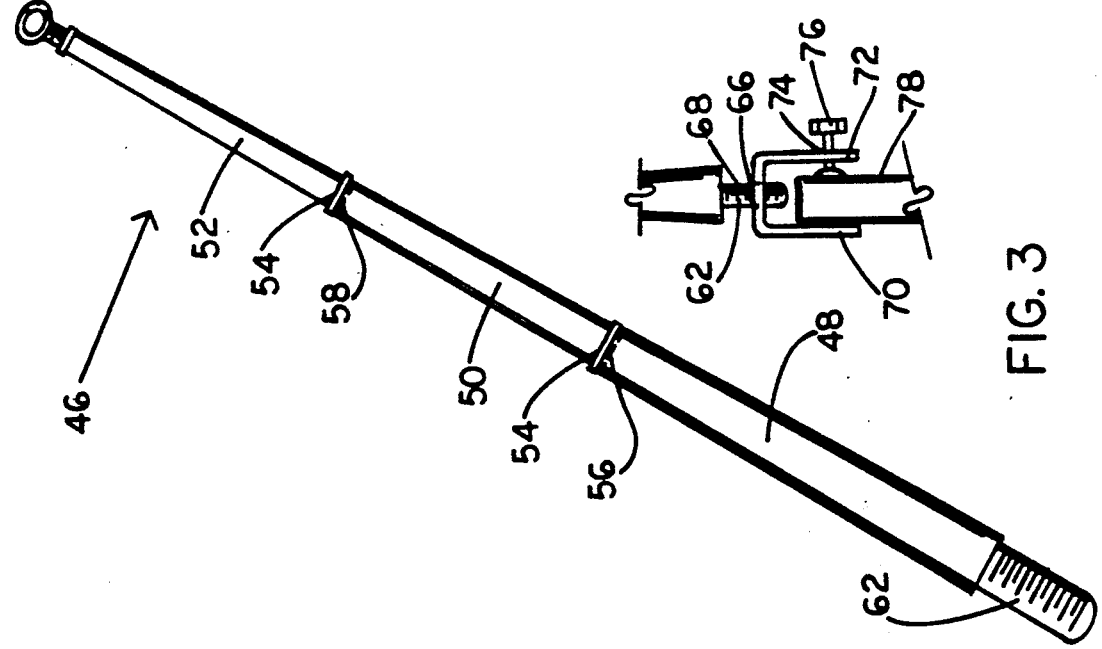
FIG. 3 is a perspective view of a collapsible pole used to position the Floating Fishing Light and Transducer adjacent a boat in accordance with the principles of this invention.

The apparatus 10 may also include a collapsible or extendable pole 46 for keeping the apparatus in a designated area, remotely displaced alongside the boat 11. The apparatus 10 can be used with or without the pole 46 depending on the circumstances. The pole 46 is provided with end members 48 and 52 and an intermediate member 50 (FIG. 3). The end member 48 and intermediate member 50 are each provided with an opening 54 formed therein. The intermediate member 50, which has a diameter smaller than that of the end member 48, is slidably mounted in the opening 54 of the end member 48. The end member 48 has a ridge 56 formed at the end thereof which engages a similar ridge 56 formed on the intermediate member 50. As a result when the intermediate member 50 is extended it will not come out of the opening 54 in the end member 48. The end member 52 of the pole 46 has a diameter slightly smaller than that of the diameter of the intermediate member 50. This allows the end member 52 to be slidably mounted in the opening 54 of the intermediate member 50. The end member 52 and intermediate member 50 each have an adjacently alignable ridge 58 formed at the end thereof which keeps the end member 52 from coming out of the opening 54 in the intermediate member 50. Because of this slidably mounted structure the pole 46 can be retracted and extended as desired.

The end member 52 of the pole 46 is provided with a clip 60 which is pivotably coupled thereto by a swivel member 61. The clip 60 is provided to engage the handle 26 of the apparatus 10 and thereby coupled the pole 46 thereto. The end member 48 of the pole 46 is provided with a plurality of threads 62. A mounting assembly, generally designated, by the numeral, 64 is provided. The assembly 64 includes a base member 66 having a threaded opening 68 formed therein. Spaced support legs 70 and 72 extend vertically from the base member 66. The leg 72 includes an opening 74 which receives a stop 76. The stop 76 is provided to engage portions of the boat 11 when the legs 70 and 72 are aligned therewith thereby coupling the mounting assembly to the boat. The end member 48 of the pole 46 is threadedly couplable in the opening 68 of the base member 66 of the assembly 64 thereby allowing coupling of the pole to the assembly.

When it is desired to use the apparatus 10 the user may utilize the pole 46 to extend the apparatus into the water. Once the apparatus is properly positioned in the water and the pole 46 coupled to the boat 11 (FIG. 1) the light 22 and transducer 34 are then activated. Once this is done the apparatus 10 lights the area and the transducer emits a signal into the water. The light will tend to draw fish to the apparatus while the transducer emitts a signal which will ultimately allow the locator 44 to determine whether fish are present and at what depth.

Figure 4:
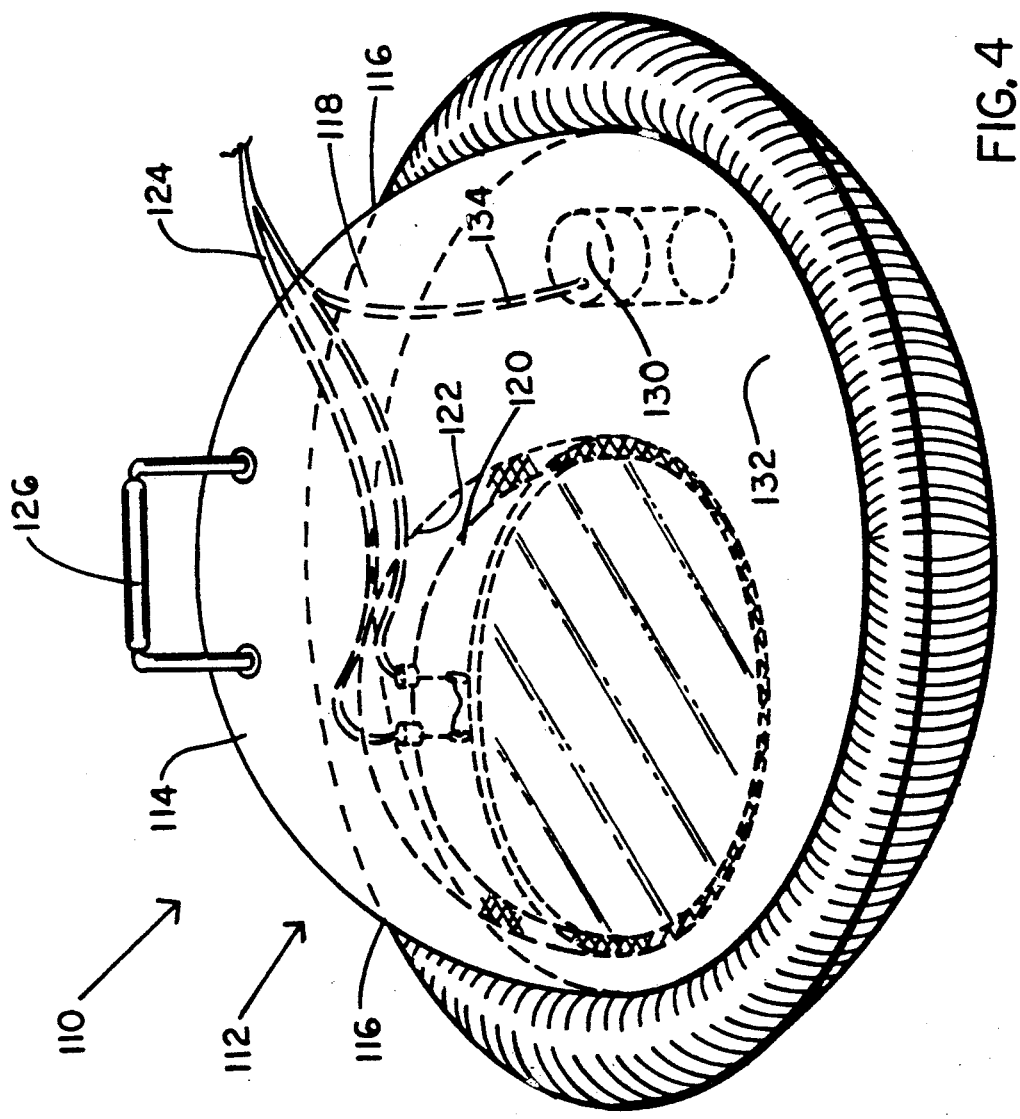
FIG. 4 is a perspective view illustrating a second embodiment of the Floating Fishing Light and Transducer in accordance with the principles of this invention.

A second embodiment of the invention is illustrated in FIG. 4. As illustrated a floating fishing light and transducer apparatus, generally designated, by the numeral, 110 is provided. The apparatus 110 includes a bowl shaped support housing, generally designated, by the numeral, 112. The support housing 112 is provided with an upper portion 114, descending wall portions 116 and an open area 118. The support housing 112 is formed of a bouyant material, such as, for example, foam rubber which is capable of floating on top of the water 12. A light 120 is coupled in the open area 118 to a lower portion 122 of support housing 112. The light 120 is water sealed in the housing and is electrically coupled to the power source 23 on the boat 11 by electrical leads 124. A handle 126 is coupled to the upper portion 114 of the support housing 112 to facilitate movement of the apparatus 110.

A transducer 130 for emitting a signal is coupled to a lower portion 132 of the housing 112 so that portions thereof extend into the water 12. The light 120 acts as a counter weight in this embodiment to counter balance the weight of the transducer 130 and assure that the apparatus 110 is always properly floating on top of the water 12. The transducer 130 is electrically coupled by electrical leads 134 to a power source 23 and on board fish locating equipment 44 (FIG. 1). The apparatus 110 may also include a collapsible pole 46 (FIG. 3) for holding the apparatus 110 in a designated area alongside the boat 11.

When it is desired to use the apparatus 110 the user may utilize the pole 46 to extend the apparatus into the water and then couple the pole to the boat 11. The light 122 and transducer 130 are then activated to light the area and draw fish thereto while also allowing the locator 44 to determine if fish are present and at what depth.

Figure 5:
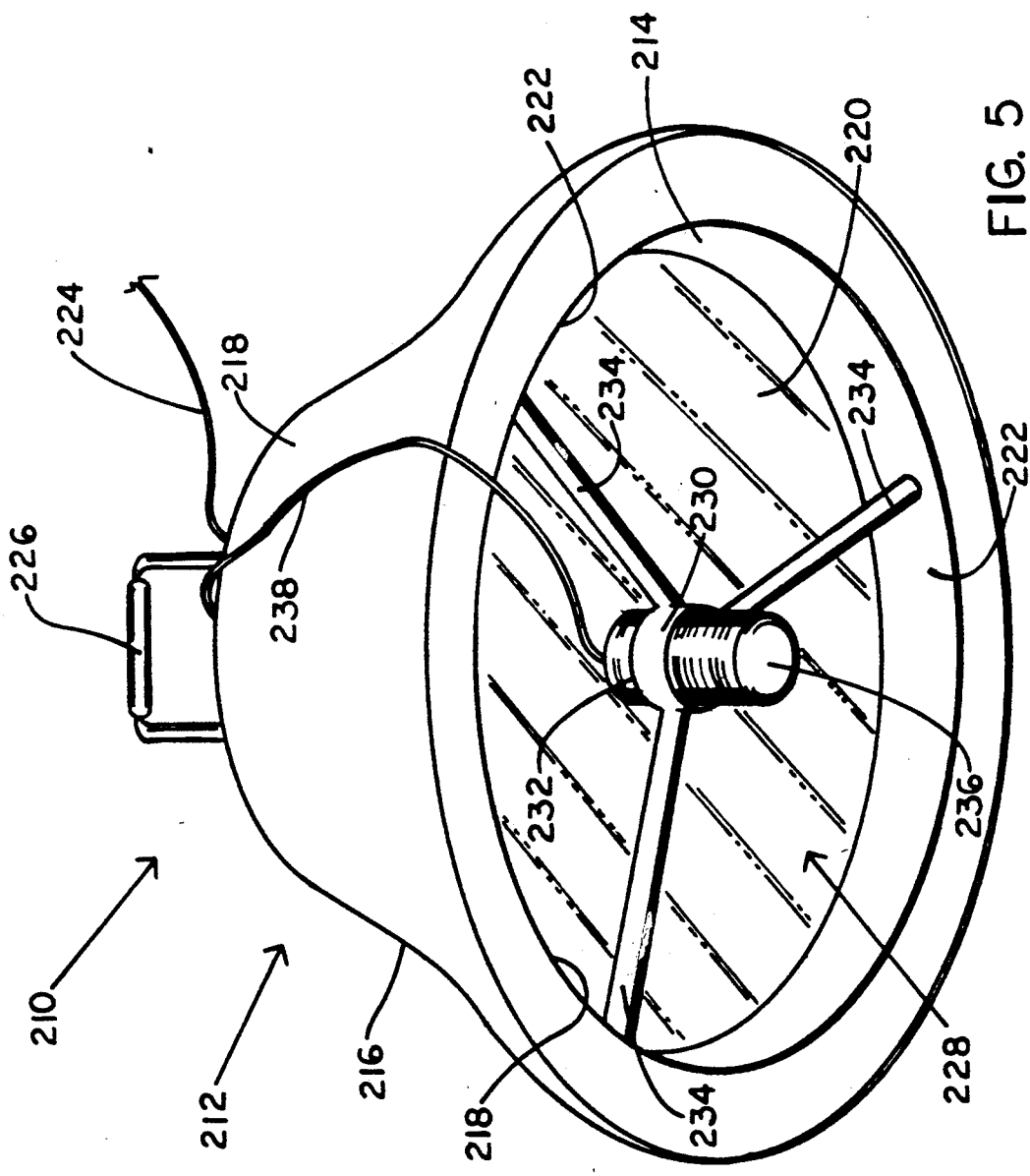
FIG. 5 is a perspective view of a third embodiment of the Floating Fishing Light and Transducer in accordance with the principles of this invention.

A third embodiment of the invention is illustrated in FIG. 5. Referring to FIG. 5 there is shown a floating fishing light and transducer apparatus, generally designated, by the numeral, 210. The apparatus 210 includes a support housing generally designated, by the numeral, 212. The support housing 212 is made of a foam shell to allow the housing to float on the water 12. A water sealed light 220 is coupled in an open area 214 to an upper portion 216 of the support housing 212. The light 220 is electrically coupled to a power source 23 on board the boat 11 by electrical leads 224. A handle 226 is coupled a top outer portion 218 of the support housing 212.

The apparatus 210 is also provided with a transducer support assembly, generally designated, by the numeral, 228. The transducer support assembly is provided with an intermediate support bracket 230 which has an aperture 232 formed therein. A plurality of support arms 234 are coupled to extend from the bracket 230 into coupling engagment with lower portions 222 of support housing 212.

A transducer 236 for emitting a signal is mounted in the opening 232 of support bracket 230 so that portions thereof will extend into the water 12. The transducer 236 is electrically coupled by electrical leads 238 to the power source 23 and on board fish locating equipment 44. The apparatus 210 may also include a collapsible pole 46 for holding the apparatus in a designated area alongside the boat 11.

When it is desired to use the apparatus 210 the user may utilize the pole 46 to extend the apparatus into the water. The light 220 and transducer 236 are then activated. Once this is done the apparatus lights the area and attracts fish while the transducer emits signals that will allow the locator to determine if fish are present and at what depth.

It should be understood that the various embodiments of the apparatus described herein may be used without the extendable pole such as when the apparatus is used in a confined area. The apparatus may also be used without a boat such as, for example, when ice fishing as long as a portable power source is available.

It should be understood that various changes and modifications can be made without departing from the spirit of the invention as defined in the claims.

What is claimed:

1. A floating fishing apparatus including:
   a housing;
   means for emitting light therefrom mounting in an upper portion of the housing for lighting up an area of water around the fishing apparatus and for attracting fish to the area;
   a buoyant member coupled around a lower portion of the housing for floating and maintaining the housing on top of water;
   signal emitting means coupled to the buoyant member so that portions thereof extends into the water when the buoyant member is floating on top of the water;
   a power source located remotely from the housing for activating the light emitting means and the signal emitting means;
   means for electrically coupling the light emitting means and signal emitting means to the power source so that the light emitting means and signal emitting means can be activated; and
   an extendable pole having one portion thereof coupable to the housing and another portion thereof coupable to a boat in the water for maintaining the housing in a designated area adjacent the boat.

2. A floating fishing apparatus as defined in claim 1 wherein the extendable pole includes:
   a first member having an opening forward therethourgh;
   a second member, having an opening formed therethrough slidable couple in the opening in the first member;
   a third member slidably coupled in the opening in the second member;
   means pivotably coupled to the end of the third member for coupling the third member to the housing; and
   means for coupling the first member to the boat.

3. A floating fishing apparatus as defined in claim 2 further including means responsive to the signal emitting means for determining the presence and depth of fish in a designated area.

4. A floating fishing apparatus including:
   a buoyant housing member having an opening formed therein for floating on top of water;
   means for emitting light therefrom mounted in an upper portion of the housing member for lighting up an area of water around the fishing apparatus and for attracting fish to the area;
   signal emitting means coupled to the buoyant housing member so that portions thereof extends into the water when the buoyant housing member is floating on top of the water;
   a power source located remotely from the housing for activating the light emitting means and the signal emitting means;
   means for electrically coupling the light emitting means and signal emitting means to the power source so that the light emitting means and signal emitting means can be activated; and
   an extendable pole having one portion thereof coupable to the housing and another portion thereof coupable to a boat in the water for maintaining the housing in a designated area adjacent the boat.

5. A floating fishing apparatus as defined in claim 4 wherein the extendable pole includes;
   a first member having an opening forward therethourgh;
   a second member, having an opening formed therethrough slidable coupled in the opening in the first member;
   a third member slidably coupled in the opening in the second member;
   means pivotably coupled to the end of the third member for coupling the third member to the housing; and
   means for coupling the first member to the boat.

6. A floating fishing apparatus as defined in claim 5 further including means responsive to the signal emitting means for determining the presence and depth of fish in a designated area.

7. A floating fishing apparatus including:
   a buoyant housing member, having an opening formed therein, for floating on top of water;
   means for emitting light therefrom mounting in an upper portion of the housing member for lighting up an area of water around the fishing apparatus and for attracting fish to the area;
   signal emitting means;
   means for coupling the signal emitting means in the opening of the housing member so that portions thereof extends into the water when the housing member is floating on top of the water;
   a power source located remotely from the housing for activating the light emitting means and the signal emitting means;
   means for electrically coupling the light emitting means and signal emitting means to the power source so that the light emitting means and signal emitting means can be activated; and
   an extendable pole having one portion thereof coupable to the housing and another portion thereof coupable to a boat in the water for maintaining the housing member in a designated area adjacent the boat.

8. A floating fishing apparatus as defined in claim 7 wherein the extendable pole includes:
   a first member having an opening forward therethourgh;
   a second member, having an opening formed therethrough slidable coupled in the opening in the first member;
   a third member slidably coupled in the opening in the second member;
   means pivotably coupled to the end of the third member for coupling the third member to the housing; and means for coupling the first member to the boat.

9. A floating fishing apparatus as defined in claim 8 wherein the signal emitting coupling means includes:
 a first member having an opening formed therein for supporting the signal emitting means in the opening;
 a second member, coupling to the first member and to a first lower position of the housing member;
 a third member coupled to the first member and to a second lower portion of the housing member; and
 a fourth member coupled to the first member and to a third lower portion of the housing member.

10. A floating fishing apparatus as defined in claim 9 further includes means responsive to the signal emitting means for determining the presence and depth of fish in a designated area.

* * * * *